United States Patent [19]
Hofmann

[11] 3,929,026
[45] Dec. 30, 1975

[54] FOAMED CONVEYOR BELT

[76] Inventor: Dieter Albrecht Hofmann, 2419 Paliswood Road, S.W., Calgary, Alberta, Canada

[22] Filed: Apr. 12, 1974

[21] Appl. No.: 460,639

[30] Foreign Application Priority Data
Apr. 13, 1973 Canada................................ 168702

[52] U.S. Cl.................... 74/237; 74/231 P; 156/140
[51] Int. Cl.² .... F16G 1/22; F16G 1/00; B29H 7/22
[58] Field of Search .............. 74/231 R, 231 P, 237; 156/140

[56] References Cited
UNITED STATES PATENTS
| | | | |
|---|---|---|---|
| 3,221,869 | 12/1965 | Paasche ........................... | 74/237 X |
| 3,545,293 | 12/1970 | Marzocchi et al. ............... | 74/231 R |

*Primary Examiner*—Leonard H. Gerin

[57] ABSTRACT

This invention relates to the product, a method, and to an apparatus for the production of belts of self-foaming closed cellular, self-skinning elastomeric materials preferably having flexible inextensible reinforcing members such as stranded steel cables extending longitudinally through the body of the belt. In a preferred form the invention comprises a conveyor belt comprising a longitudinally extending polyurethane shaped structure reinforced with longitudinal flexible reinforcing members, said polyurethane structure comprising a body of high density closed-cell polyurethane foam surrounding the reinforcing members and bonded thereto, said foam having a density of at least about 15 lb/cu. ft. and preferably at least about 30 lb/cu.ft. In one aspect the method comprises continuously supplying reinforcing members in laterally spaced relation to each other, to a moulding compartment, continuously supplying a foamable polyurethane composition to the moulding compartment, foaming the polyurethane composition in situ around the reinforcing members to fill the moulding compartment and to set and to hold the reinforcing members in a laterally spaced relation to each other, and continuously withdrawing the foamed shaped belt from the moulding compartment. The moulding compartment preferably includes two opposing walls to form an upper and lower surface of a reinforced belt respectively, each of said opposed walls comprising an endless conveyor exposing a non-adhering face to the interior of the moulding compartment, endless conveyor wall advancing means to advancing the non-adhering face at a rate consistent with the withdrawal of the reinforced belt from the outlet end of the moulding compartment.

6 Claims, 6 Drawing Figures

FOAMED CONVEYOR BELT

DISCLOSURE OF THE INVENTION

This invention relates to the product, a method, and to an apparatus for the production of belts, such as conveyor belts of self-foaming closed cellular, self-skinning elastomeric materials. For greater strength these belts will normally have flexible inextensible reinforcing members such as stranded steel cables extending longitudinally through the body of the belt.

At the present time most conveyor belts used in industry are made of rubber with or without textile reinforcements, occasionally carrying additional wire ropes to take the longitudinal forces. Variations on the basis of design, such as vertical extensions, serve a variety of purposes such as to convey semi-liquids, granular materials, and the like.

Steel wire or steel rope reinforced belts are occasionally used as timer belts in combustion engines, farm equipment, and the like. It has been tried to use solid polyurethane conveyor belts, but all attempts have failed so far. In heavy industrial use, conveyor belt surfaces are subjected to deep bruises and cuts. As polyurethane has a relatively low nicked-tear resistance, these initial cuts will soon propogate and tear through the entire conveyor belt, resulting in more severe damage or even separation.

In making a cable reinforced conveyor belt prior to this invention, the usual procedure was to arrange the cables in laterally spaced, mutually parallel relation against a relatively thick sheet of unvulcanized, rubber-like material referred to as base gum which overlies a lamination of several rubber covered fabric plys. The cables next have been covered with one or more sheets of unvulcanized rubber-like material referred to as tie gum and then this lamination has been passed through the bite of a pair of squeeze rolls having either smooth or corrugated peripheral pressure surfaces. The squeeze rolls advance the lamination forwardly and the pressure of the rolls has been utilized to embed the cables in the base gum and the tie gum. Thereafter, any additional desired fabric plys and a surrounding rubber cover have been applied to complete assembly of the belt for vulcanization.

Also, the prior art describes a method wherein the tie gum is adhered to the base gum, exerting adhering pressure directly only on the portion of the tie gum intermediate the cables while maintaining the cables free of squeezing pressure that tends to shift them laterally and in the preferred embodiment of the prior art, less is applied to the cables. The pressure required to accomplish this is very slight compared with the pressure exerted by the squeeze rolls of the initially described method.

Prior art conveyor belts as used in industry are manufactured according to the above indicated methods and are based on rubber materials, using reinforcing members such as stranded steel cables and a pre-determined number of fabric plys to comply with a multitude of parameters as prescribed by the application. While conveyor belts of the described nature are in wide use, their low abrasion, impact, and tear resistance, and poor low temperature characteristics are undesirable. Their varied application, also demands a special custom moulded product involving special compounding and processing conditions for almost every single order.

In the prior art there are disclosures relating to production of articles such as foamed belts. However such prior art generally deals with lower density open cell foam (in the range of 5 to 15 lbs/cu ft) or with belts laminated to an exterior material or a different composition, or the like.

The poor nicked-tear resistance of polyurethane can be overcome by substituting for the solid polyurethane a microcellular high density foam. Because of the random structure of the microcellular foam, the tear resistance is increased to values better than those achievable with rubber. Utilizing speciality compounding which will allow a skin effect while producing the conveyor belt, solid or nearly solid polyurethane will be available on one or both sides of the conveyor while high density microcellular foam will form the center. Thus, the high abrasion resistance of solid polyurethane will still be available at the belt surface.

Cuts and bruises will still cause the carrying surface to "break apart." However, these cuts will generally extend into the conveyor belt only to the point where they reach the high density microcellular foam. There, because of the increased tear resistance, the "track" will be stopped. The tear appears to stop by stress relief on reaching the foam cell structure. The surface of a heavily used industrial conveyor belt made out of the above described material may therefore bear a large number of cuts breaking the surfaces up into small islands of possibly three to ten square inches in size.

Polyurethane foams of high and low density as well as closed and open cellular structure are known and have been used for many years.

Known, for instance, is the use of totally enclosed moulds in order to achieve a high density closed microcellular foam in a mould of given physical dimensions. With the known chemical process and the controlled mould interface temperature, certain parts have previously been produced in quantity even with a certain skin effect.

This specification discloses for the first time a moulding apparatus capable of producing a skinned closed cellular foam structure of pre-determined densities on a continuous basis in one integral moulding operation, while at the same time, reinforcing means are moulded into that structure. The bonding strength of these reinforcing means to the surrounding polyurethane may be varied by changing the density of the urethane directly in contact with the reinforcing means according to end use purposes. This can be achieved by control of the surface temperature of the reinforcing means, as well as by other means.

Accordingly, it is an important object of the present invention to provide an improved product by the efficient use of castable polyurethane base elastomeric materials of a self-foaming closed cell structure and capable of exhibiting a controlled self-skinning effect while accurately maintaining the position of reinforcing means within the product. While the center of the product will consist of the closed cellular foam, the density of which may be adjusted to suit the particular load carrying characteristics of a given end user, the outer portions will increase in density and consist finally in a higher density closed cellular or an entirely solid exterior skin. Choosing the right elastomeric material, castable self-foaming self-skinning polyurethanes, will provide the end user with the desired high abrasion, impact, and tear resistance characteristics and low temperature performance as provided by the extraordinary physical qualities of such materials.

Another object of the invention is to provide a process for the production of a self-foaming closed cellular controlled self-skinning product, such as conveyor belts, wherein the process provides a solid or very high density foam exterior wherein the thickness of this solid or very high density foam exterior is controlled through processing means, and a closed cellular center, the density of which can be controlled and adjusted by the processing parameters. Reinforcing means may be bonded to the elastomeric closed cellular center body, while the thickness of the closed cellular foam coating the reinforcing members is controlled by the processing conditions. The thickness of the exterior skin may be varied by controlling the processing conditions across the width of the product while said product is advancing longitudinally during the process of manufacture.

A further object of the invention is to provide an apparatus for the production of a closed cellular self-skinning reinforced structure, such as reinforced conveyor belts and the like, wherein the solid or very high density foam side-forming exterior may individually be controlled in thickness at will and wherein the density of the closed cellular foam center of the manufactured product may be controlled and adjusted by the processing parameters, and wherein the solid or very high density foam skin bonded to the accurately positioned reinforcing members may be controlled through a simple temperature control means.

An additional object of the invention is to provide such an apparatus which occupies little space despite the fact that it may be utilized for continuous production of very long foamed structures, which is equally useful for structures which are in part bonded and in part consist of an integral solid layer and which is constructed and assembled in such a way as to ensure that the solid or cellular structure of the foam layer remains intact during the bonding operation.

A concomitant object of my invention is to provide a method and apparatus of the above described type which is constructed and assembled in such a way that it simultaneously controls not only the total thickness but also the width of a continuously formed structure of a solid or self-foaming closed cellular self-skinning elastomeric material with reinforcing members.

Another object of the invention is to provide an apparatus of the above outlined characteristics with the exception that it is used in a noncontinuous process, as the product may well be manufactured on a batch basis, moulding unit lengths, as provided by the longitudinal extension of the mould, to each other or using said mould to safely splice conveyor belt sections of any given lengths or materials to each other while utilizing the proper bonding or cross linking agents for these materials.

In one aspect the present invention provides a process and an apparatus for the production of bonded longitudinal flexible belt structures such as conveyor belts, by bonding closed cellular self-skinning elastomeric material to accurately positioned reinforcing means. The density of the foam center may be controlled through the variations in the processing speed and other factors. The density of the skin of the side-forming exterior and of the material adjacent to the reinforcing means is controlled principally by temperature. The thickness and width of the final product is controlled by design features of the apparatus.

The self-foaming elastomeric material will exhibit against the elements forming the moulding compartment during the manufacturing process certain forces which are in direct relation to the achieved density of the closed cellular foam.

The apparatus is designed and assembled in a self-sealing manner to comply with these forces as exhibited during the process of manufacturing. Depending on the particular elastomeric materials involved it may be required to provide, in conjunction with the moulding process, continuous or intermittent means to post-cure the completed structure in order to achieve pre-determined physical and chemical properties of the final product.

The novel apparatus for the practice of my process may comprise a pair of spaced relatively wide first elements which define a compartment of given height and length, and a pair of second elements defining the width of said moulding compartment. The elements of said moulding compartment are provided with means for heating and cooling as may be required by the process to produce a desired skin effect. The elements are formed preferably with smooth non-adhering faces adjacent to the compartment and which are guided by special non-adhering conveying means through the moulding compartment. The faces of the elements are preferably adjustable in such a way as to vary the width and the height of the compartment so that, in processing the elastomeric material in the direction in which the conveyor means advance, a final product of desired width and thickness may be obtained. Throughout the process the pair of wide elements facing each other will normally be parallel, whereas the pair of second elements may be parallel or not parallel.

The present invention therefore provides a belt comprising a longitudinally extending polyurethane shaped structure, said polyurethane structure comprising a body of high density closed-cell polyurethane foam, said foam having a density of at least about 15 lbs/cu.ft. and preferably at least about 20 lbs/cu.ft. and most preferably in the range of about 30 to about 45/cu.ft.

In another aspect the present invention provides a belt comprising a longitudinally extending polyurethane shaped structure reinforced with longitudinal flexible reinforcing members, said polyurethane structure comprising a body of high density closed-cell polyurethane foam surrounding the reinforcing members and bonded thereto, said foam having a density of at least about 15 lbs/cu.ft. and preferably at least about 20 lbs./cu.ft. and most preferably in the range of about 30 to about 45 lbs/cu.ft. The reinforcing members preferably comprise stranded steel cables distributed centrally across the width of the belt.

In a further preferred embodiment the polyurethane structure comprises a central body of high density closed-cell polyurethane foam covered at least partly by an integral skin of higher density or substantially solid polyurethane.

In another aspect the present invention provides a method of producing a longitudinally extending flexible polyurethane belt reinforced with longitudinally flexible reinforcing members, which method comprises continuously supplying reinforcing members in laterally spaced relation to each other, to the central area of a moulding compartment, continuously supplying a foamable polyurethane composition to the moulding compartment, foaming the polyurethane composition in situ around the reinforcing members to fill the moulding compartment and to set and to hold the reinforcing members in a central laterally spaced relation to each other, and continuously withdrawing the foamed shaped belt from the moulding compartment.

In a preferred aspect the present invention provides such a method comprising continuously supplying to the central area of a moulding compartment a plurality of stranded steel cables in laterally spaced parallel relation to each other, continuously supplying a self foaming self skinning polyurethane composition to the moulding compartment, continuously foaming the polyurethane composition in situ around the steel cables to fill the moulding compartment and to set and to hold the reinforcing members in a central laterally spaced parallel relation to each other, and continuously withdrawing the foamed shaped belt from the moulding compartment.

In preferred embodiments such methods comprise controlling the temperature of one or more surfaces of the moulding compartment in order to achieve a higher foam density in the belt adjacent to said controlled surface. Similarly the temperature of the reinforcing members may be controlled in order to achieve a higher foam density in the belt adjacent to said controlled surface.

In another aspect the present invention provides an apparatus for the production of reinforced polyurethane foam belt comprising a moulding compartment including spaced moulding walls, an inlet end and an outlet end, means for supplying longitudinal reinforcing members in laterally spaced relation to each other into the inlet end means for supplying foamable polyurethane composition to the moulding compartment around the longitudinal reinforcing members, means for holding the foaming polyurethane composition in place during setting of the composition, and means for withdrawing the resulting reinforced belt from the outlet end of the moulding compartment.

In a preferred embodiment such an apparatus includes two opposing walls to form an upper and lower surface of a reinforced belt respectively, each of said opposed walls comprising an endless conveyor exposing a non-adhering face at a rate consistent with the withdrawal of the reinforced belt from the outlet end of the moulding compartment.

In another preferred embodiment such an apparatus includes two opposing walls to form an upper and lower surface of a reinforced belt respectively, said opposed walls being formed by folding over an endless conveyor exposing a non-adhering face to the interior of the moulding compartment, endless conveyor wall advancing means to advancing the non-adhering face at a rate consistent with the withdrawal of the reinforced belt from the outlet end of the moulding compartment.

Certain other features of the apparatus reside in the provision of conveying means, as mentioned above, which advance the produced structure in the longitudinal direction of the apparatus. Further other features reside in the provision of side walls without the previously mentioned conveying means, while still allowing the forwardly movement of the produced structure in the longitudinal direction of the apparatus. Other features reside in the provision of heating and cooling zones and means for the elements making up the moulding compartment as to provide for the individual thickness control of the exterior skin of each side as well as skin thickness variations over the width of the belt as may be deemed necessary.

Still other features of the apparatus reside in the provision of the self-sealing discharge head which accurately positions flexible, inextensible reinforcing members such as stranded steel cables during the process of manufacturing.

The novel features which are considered characteristic for the invention are set forth in particular in the appended claims. The invention itself, however, both as to its construction and its method of operation, together with the additional objects and advantages thereof, will be best understood from the following detailed description of certain specific embodiments when read in connection with the accompanying drawings in which:

Figure 1:
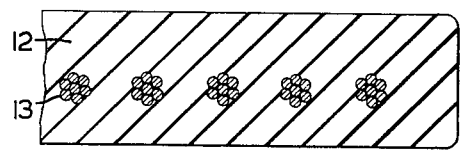
FIG. 1 is a cross-sectional view of a portion of a foamed conveyor belt with no special skin.

The formation of cellular structures is very complicated since it involves a delicate balance of gas formation, chemical and physical changes of polymerization, nucleation, bubble formation and the rheology of the polymer system. As the various chemical reactions begin, polymer viscosity and modulus build-up must be sufficient to trap individual gas bubbles and prevent their rupture. If viscosity modulus is slow, bubbles rupture because of insufficient extensibility of the cell walls, and the result is open cells or collapse. If the reactions are very rapid, pressure created by the evolving gas can cause splitting, or high density cellular structures occur due to insufficient expansion of the gas.

Especially for polyurethanes, an equally important variable is the reaction rate between the isocyanate and the amine curing agent. For certain aromatic diamines, merely controlling temperatures gives a sufficiently precise control over reaction time. Catalysis may be used to accelerate slow reactions. The most important factor in the microcellular system is adequate control of the polymerization reaction to allow the jelling polymer to remain extensible yet strong enough to prevent cell wall rupture as the gas expands.

Many vaporizable fluids are known in the art and may be considered as blowing agents. Methylene chloride is preferred for a number of reasons. It has a low molecular weight, it yields a large amount of gas per unit weight, it is relatively safe to handle and it is readily available at low cost.

A commercially obtainable polymer is master batched along with the blowing agent such as methylene chloride. Examples of satisfactory polymers are ADIPRENE L-167 and ADIPRENE L-100 which are trade marks of E.I. du Pont de Nemours & Co., Inc., for their brands of liquid urethane rubber which are the reaction products of diisocyanate and polyalkylene ether glycol. These elastomers convert into tough elastic rubbery materials having excellent resistance to abrasion, oxidation and ozone. A suitable surfactant is the silicone copolymer known as SF 1034, a trade mark of the General Electric Company.

As normal processing temperatures of polyurethane equipment exceed the boiling point of methylene chloride (40°C), flashing of the methylene chloride is prevented by maintaining a pressure of about 14 psig (1 at) on the master-batch prior to final mixing. Then a curing agent is added such as Caytur 7 (trademark of E.I. duPont de Nemours for an Eutectic mixture of m-phenylenediamine and cumenediamine which is a liquid above 65°F.

As the reactive ingredients are discharged from the mixer, gas evolution has already begun and expansion is completed in about 20 seconds. While this is a relatively short time, this technique has been successfully demonstrated in intermittent and continuous machines. In approximately one minute the compound is tack-free and parts can be de-moulded in three to five minutes, in cases where an intermittent moulding techique is used.

The density of the microcellular Adiprene L foam is controlled by the amount of methylene chloride used in the formulation and the ingredient temperatures. Gross density variations are achieved by changing the quantity of the blowing agents. Polymer temperature is varied for close control of core density. The polymer temperature is the initial polymer temperature, not the exotherm reaction temperature. As the polymer temperature is raised, core density is reduced according to the temperature gradient which develops in the interior of the part core foam.

Density is also effected by the polymer type and isocyanate content. It should also be mentioned that the properties of the cellular product can be altered by blending various polymers.

An example of a useful formulation is shown in Table I.

TABLE I

| Stream 1 | | Stream 2 | |
| --- | --- | --- | --- |
| Adiprene L-167* | 100 | Caytur 7* | 9.4 |
| Methylene Chloride | 8 | Colour | 2.0 |
| Silicone Surfactant | 2 | | |

These two "streams" are mixed just before discharge.

Heat can be added or withdrawn from the reacting mass by varying the temperature of all or part of the moulds. These temperature differentials appear to affect the efficiency of gas utilization at the mould interface. As the mould temperature is decreased, skin thickness increases, as shown in Table II.

TABLE EII

Typical Skin Thickness and Mould Temperature

| Mold Temperature (°C) | Total Skin Thickness (mm) | (inch) | Density (g/cm³) | (lbs/cuft) |
| --- | --- | --- | --- | --- |
| 25 | 12.7–14.2 | 0.5–0.562 | 1.04 | 65 |
| 70 | 3.17–4.7 | 0.125–0.187 | 0.9 | 57 |
| 95 | 0.79–1.5 | 0.031–0.062 | 0.5 | 39 |

Based on the above mentioned materials, for example, using a cumene diamene/m-phenylene diamene cure, maximum thickness of the skin is approximately 9/16 inches (14.2 mm) when the mixture is cast in ½ inch wall thickness aluminum mold at room temperature.

Virtually no skin is formed when the mold temperature closely corresponds to the exothermic temperature of the reacting mass. As the skin thickness is increased with lower mold temperature, it becomes less cellular as indicated by the higher densities. Since some degree of blowing will always occur, the skin density will never equal that of solid polyurethane, however, at 25°C mold temperatures the skin density approaches that of solid polyurethane.

While the above mentioned process is based on polymers as supplied by E.I. DuPont de Nemours and Co., similar results may be obtained for example with chemicals from the UPJOHN COMPANY, MATERIALS CPR X160-68-1 N. For this system a mold temperature of about 80°F would produce a 1/16 inch skin. Here again the cream, rise, and tack-free times may be controlled within a limited area by controlling the mold and material temperatures. Wider variations may be obtained through chemical variations.

Within the process the maximum starting temperature will normally be in the neighbourhood of 185°F, and in any case should not exceed that of the exotherm reaction, giving an upper limit of about 230°F. On the low side, in order to obtain the maximum possible skin, at least 50°F. is preferred.

Figure 2:
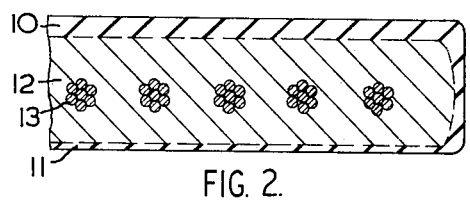
FIG. 2 is a cross-sectional view of a portion of a conveyor belt which has an integral outer skin, with different skin thicknesses at the top and the bottom of the product.

In one embodiment of this invention illustrated in FIG. 2 the different skin thickness of the upper side 10 and the lower side 11 are obtained by varying the surface temperatures of the adjacent components of the moulding compartment accordingly. The density of the simultaneously and integrally produced foamed closed cellular main body 12 is adjusted either by the through-put rate of the discharge heads at constant molding speed or at constant through-put rate of the discharge head at varying molding speed.

Steel cables 13 positioned and bonded in the foamed closed cellular main body 12 are heated to a pre-determined surface temperature for the continuous molding operation.

Figure 3:
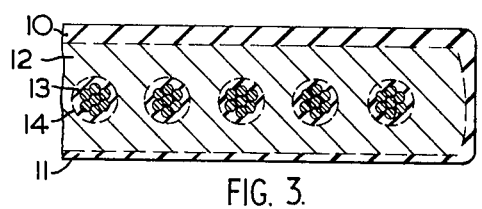
FIG. 3 is a cross-sectional view of a conveyor belt having an integral high density foam layer bonded to reinforcing steel cables.

If the surface temperature of the adjacent members of the molding compartment as well as those of the steel cables 13 are set to a certain level, i.e. 212°F for self-foaming self-skinning Du Pont ADIPRENE polyurethanes, then a uniform closed cellular foam main body 12 is achieved incapsulating the steel cables 13. In FIG. 3 the surface temperature of the continuously encapsulated steel cables 13 is substantially lowered in order to automatically achieve a bonded skin 14 of a solid or high density closed cellular nature encapsulated by the foamed closed cellular main body 12. The surface temperature of the molding compartment elements adjacent to the future load carrying side of the conveyor belt may be varied in different zones in order to obtain a varying skin thickness over the width of a conveyor belt on the load carrying side for the most efficient and economical use of the base material.

Figure 5:
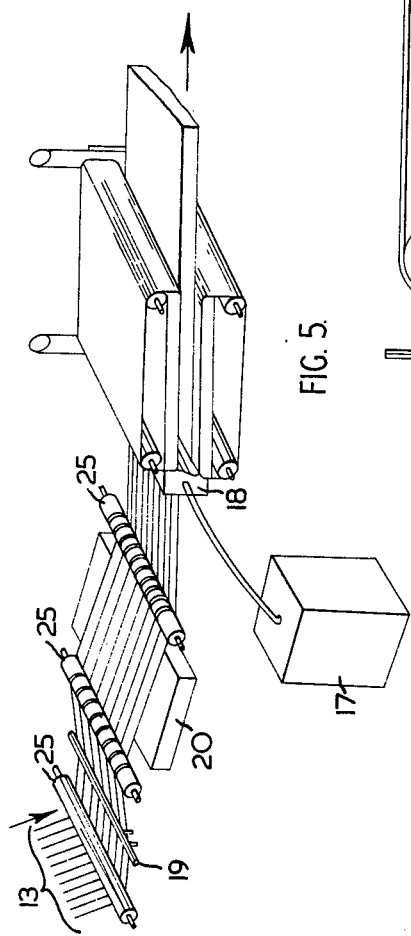
FIG. 5 is a view in oblique projection schematically illustrating suitable equipment for the positioning of steel cable and the discharging of castable foamable elastomeric material for a conveyor belt in accordance with this invention.

FIG. 5 shows in oblique projection schematically a belt molding apparatus wherein mixing/metering equipment (not shown) draws resin and cross linker (not shown) and forwards the final mix, the elastomer, to a continuous discharge head 18. A plurality of cables 13 are fed continuously through a coating zone 19, where a conventional bonding agent may be applied. From there the plurality of reinforcing steel cables 13 is led through a zone 20 where the surface temperature of said steel cables 13 will be brought to a pre-determined level. The steel cables 13 then pass through the self-sealing discharge head 18 and enter the molding compartment which is shown in the crosssectional view in FIG. 6.

Figure 6:
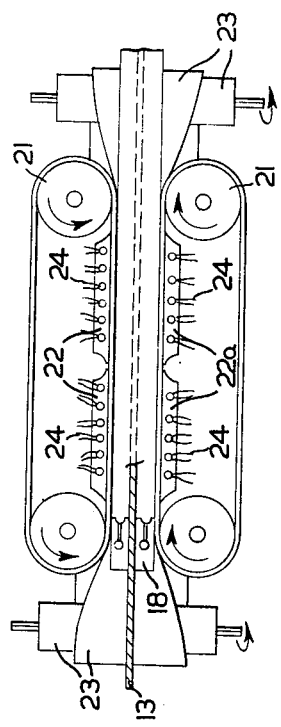
FIG. 6 is a cross-sectional view indicating the main elements of the continuous process moulding compartment showing a conveying or advancing means to transport the moulded belt structure through the compartment.

The continuous process molding compartment as shown in FIG. 6 has one set of conveying means 21 extending over the length and width of the members 22 and 22a forming this area of the molding compartment. Another set of conveying means 23 are extending over the entire height and length of the members forming the molding compartment. All members forming the molding compartment contain means 24 as to individually control the temperature of the upper 22 or lower 22a members in order to obtain a varying skin thickness (FIGS. 1, FIG. 3) of the upper skin 10 and lower skin 11 of the final product.

Figure 4:
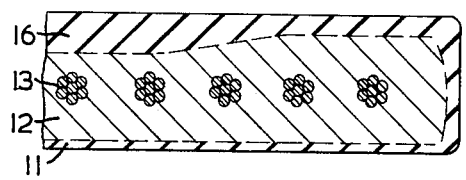
FIG. 4 is a cross-sectional view of a portion of conveyor belt having on one side a varying skin thickness over the width of the belt

The temperature controlling means 24 may also be adjustable as to certain zones over the width of the molding compartment as to obtain a product of varying skin thickness 16, FIG. 4 over the width of the final product. Depending on the particular type of elastomeric materials used the conveyor belts may be completely finished when leaving the molding compartment.

Certain elastomeric materials, however, will have to undergo a post-curing process in order to obtain required physical properties. Those materials requiring a post-curing operation may be divided into materials allowing flexing before final cure is obtained and those which have to be cured in an un-flexed state. Those which allow flexing directly after leaving the molding stage permit extremely shortened post-curing equipment as the produced conveyor belt may be led in a meandering way over alternate rolls to more efficiently use post-curing space.

The discharge or casting head 18 which forms one side of the molding compartment is of special design in order to have fresh material mix at all times flush out all mixed material to avoid crosslinking and consequent build up of boundary layer material. After leaving the discharge head 18 which incorporates a multitude of self-sealing through holes as required to allow the continuous feed of reinforcing steel cables 13, the self-foaming and self-skinning characteristics of the material do take effect. At constant through-put of the discharge head the density of the final product will be controlled by the speed of the conveying means 21 and 23 while a skin effect may be exhibited due to the temperature controlling means 24 in the members 22 and 22a as well as 23 forming the molding compartment.

The steel cables 13 are preferably lubricated with a lubricant compatible with the desired bonding or cross-linking system for the elastomeric material. A suitable lubricant in many cases is castor oil, which is compatible for bonding and/or cross linking with polyurethanes. With the provision of certain guide rolls 25 cables 13 are guided from their respective storage reels (not shown) through the area 19 where they may be coated with a bonding cement in cases where a compatible lubricant is not available. After the bonding agent is applied to the steel cables 13 the cables may be guided through an infra-red pre-heating oven 20 in order to obtain cement activation and surface temperatures as required to achieve pre-determined thicknesses of solid or high density foam material (see item 14 FIG. 3) on the surfaces of said cables 13.

It should be understood that the various types of designs and their arrangements in conveyor belts as described in the foregoing represent a typical belt construction reinforced by flexible cables. Other type plys made of fabric reinforced elastomeric materials commonly used in belting and arrangements of them may be assembled with the cables in accordance with the principle of this invention.

The embodiments of the invention in which an exclusive property or privelege is claimed are defined as follows:

1. A belt comprising a longitudinally extending polyurethane shaped structure, said polyurethane structure comprising a central body of high density closed-cell polyurethane foam at least partly covered by an integral skin of higher density or substantially solid polyurethane, said foam having a density of at least about 15 lb/cu. ft.

2. A belt as in claim 1 comprising a longitudinally extending polyurethane shaped structure, reinforced with longitudinal flexible reinforcing members, said body of high density closed-cell polyurethane foam surrounding the reinforcing members and being bonded thereto.

3. A conveyor belt as in claim 2 wherein the reinforcing members comprise stranded steel cables distributed centrally across the width of the belt.

4. A belt as defined in claim 1 wherein said polyurethane foam has a density within the range of 15 to 45 lb/cu. ft.

5. The invention as defined in claim 4 wherein said polyurethane foam has a density within the range of 30 to 45 lb/cu. ft. and wherein said integral skin has a density of at least 45 lb/cu. ft.

6. The belt as defined in claim 1 wherein said integral skin has a density of at least 45 lb/cu. ft.

* * * * *